(No Model.)
W. R. COLE.
TELEPHONE.
No. 352,735. Patented Nov. 16, 1886.
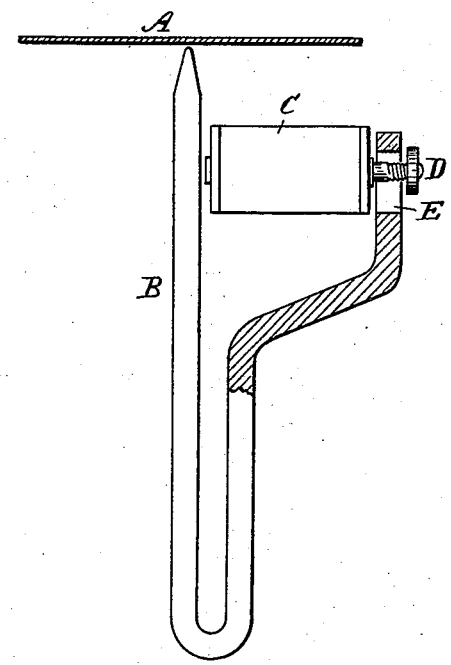
Attest:
John Schuman.
Inventor:
William R. Cole.
by his Att'y
Thos. S. Sprague

UNITED STATES PATENT OFFICE.

WILLIAM R. COLE, OF DETROIT, MICHIGAN, ASSIGNOR TO WM. R. COLE, FRANK G. SMITH, AND GEO. W. MOORE, TRUSTEES, OF SAME PLACE.

TELEPHONE.

SPECIFICATION forming part of Letters Patent No. 352,735, dated November 16, 1886.

Application filed May 27, 1886. Serial No. 203,386. (No model.)

*To all whom it may concern:*

Be it known that I, WILLIAM R. COLE, of Detroit, in the county of Wayne and State of Michigan, have invented new and useful Improvements in Telephones; and I do hereby declare that the following is a full, clear, and exact description thereof, reference being had to the accompanying drawings, which form a part of this specification.

This invention relates to certain new and useful improvements in receiving telephones; and the invention consists in the peculiar construction and arrangement of the parts, by means of which a very sensitive and efficient instrument is produced, more so than those now known and used. In most of the instruments for this purpose only one pole of the permanent magnet is used, and consequently with a great loss. In cases where the two poles are or have been used, they are or have been bridged or connected together with the electro-magnet, thereby causing a partial loss of the effect of the magnetism upon the diaphragm.

In the accompanying drawings, wherein my invention is shown in vertical elevation, A represents the diaphragm, which may be supported in any suitable and known manner.

B is a permanent magnet.

C is an electro-magnet or helix.

D is an adjusting-screw working within a slot, E, in the permanent magnet.

It will be observed that in my construction one pole of the electro-magnet is made fast to one pole of the permanent magnet, thus making it continuous to the other pole of the electro-magnet. This pole is placed a short distance from the free end of the permanent magnet and made adjustable, so that if the permanent magnet is too strong it can be moved farther away, so that the undulations of the current will produce the best effect upon the diaphragm.

The free end of the permanent magnet B is brought almost to a point, as shown, so as to concentrate all the force thereof to the center of the diaphragm. I find by experience that this, together with the electro-magnet placed as described, has a very powerful effect upon the diaphragm, which enables me to use a stiffer diaphragm than is ordinarily employed and with a better effect.

I am aware that it has been proposed to attach an electro-magnet to one pole of a permanent magnet, and provide means for moving said electro-magnet with the arm or pole of the permanent magnet to which it is attached to or from the diaphragm, and hence do not claim such construction. I deem it important that the electro-magnet be adjustable on the pole of the permanent magnet to which it is attached, for the purposes hereinbefore set forth.

What I claim as my invention is—

1. In a receiving-telephone, a permanent magnet having one of its poles free and arranged at right angles to the diaphragm of said telephone and the other pole attached to one of the poles of an electro-magnet, arranged with its axis parallel with said diaphragm, substantially as described.

2. A receiving-telephone consisting of the combination of the following elements: a diaphragm and a permanent magnet having one of its poles free and its opposite pole adjustably secured to one of the poles of an electro-magnet, as and for the purposes specified.

3. The combination, with the diaphragm A, of the permanent magnet B, having one of its poles free and arranged at right angles to said diaphragm, and the electro-magnet C, attached to the other pole of said permanent magnet, arranged with its axis parallel with the said diaphragm and adjustable to and from the same on its pole of the permanent magnet, substantially as and for the purpose specified.

WILLIAM R. COLE.

Witnesses:
H. S. SPRAGUE,
CHAS. THURMAN.